United States Patent [19]

Ooi

[11] Patent Number: 5,790,666
[45] Date of Patent: Aug. 4, 1998

[54] DECRYPTOR

[75] Inventor: Shinichi Ooi, Kanagawa-ken, Japan

[73] Assignee: Kabushiki Kaisha Toshiba, Kawasaki, Japan

[21] Appl. No.: 588,245

[22] Filed: Jan. 18, 1996

[30] Foreign Application Priority Data

Jan. 18, 1995 [JP] Japan .................................. 7-005792

[51] Int. Cl.$^6$ .............................. H04N 7/167; H04K 1/00
[52] U.S. Cl. .................................. 380/20; 380/46
[58] Field of Search .................... 380/20, 10, 5, 380/46; 364/224.21, 717; 331/78

[56] References Cited

U.S. PATENT DOCUMENTS

| | | | |
|---|---|---|---|
| 5,195,136 | 3/1993 | Hardy et al. | 380/43 |
| 5,272,753 | 12/1993 | Nakayama et al. | 380/23 |
| 5,282,249 | 1/1994 | Cohen et al. | 380/23 |
| 5,509,077 | 4/1996 | Mochrmann | 380/20 |
| 5,561,713 | 10/1996 | Suh | 380/20 |
| 5,588,058 | 12/1996 | LeBerre | 380/20 |

FOREIGN PATENT DOCUMENTS

| | | |
|---|---|---|
| 0 585 833 | 3/1994 | European Pat. Off. . |
| 3-210843 | 9/1991 | Japan . |

OTHER PUBLICATIONS

Japan: "Telecommunications Technique Working Group Reply Report", Supplemental, Section 3.5, Nov. 28, 1988, pp. 1–19, 37–40, Figures 3–8.

Guillou et al, "Encipherment and Conditional Access", SMPTE Journal 103(1994), Jun., No. 6, White Plains, NY, US, pp. 398–406.

Primary Examiner—David Cain
Attorney, Agent, or Firm—Cushman Darby & Cushman IP Group of Pillsbury Madison & Sutro LLP

[57] ABSTRACT

A decryptor includes a descrambler for descrambling the scrambled signals using a PN signal, a PN generator which shifts the state successively from its initial state setup by a scramble-key, generates PN signals based on a conversion logic at the shifted state and is capable of changing PNG altering information for generating PN signals and a controller for decrypting a scramble-key from the scrambled signal and giving information for specifying a scramble-key and PN signal generating logic.

13 Claims, 12 Drawing Sheets

1

DECRYPTOR

FIELD OF THE INVENTION

The present invention generally relates to a decryptor which descrambles scrambled signals at a receiver for receiving in pay broadcast system which broadcasts video and audio signals by descrambling the scrambled signals by a decryptor.

BACKGROUND OF THE INVENTION

In the field of broadcast system utilizing broadcast satellites, there is a pay broadcast system which broadcasts video and audio signals by scrambling them for receiving by descrambling the scrambled signals. One example of the pay broadcast systems was presented in the replay report to "Technical Conditions on a Pay Television Broadcast System by Satellite Broadcast" inquired by the Telecommunication Technical Council in November 1988 (Bibliography 1). FIG. 9 shows the construction of the pay broadcast system presented in Bibliography 1 and the PN signal (pseudo random noise) adding system is used as the scramble system.

In this pay broadcast system, broadcast signals transmitted from a broadcast station 110 to a decryptor 210 contain scrambled video signals and sub-signals. The sub-signals contain scrambled digital audio signals, program information and peculiar information regarding the decryptor 210.

At the broadcast station 110, using a decryptor ID out of a work-key KW, subscription terms and a decryptor ID, which are peculiar information regarding the decryptor 210, a master-key Kmi is obtained from a master-key file 110g and the peculiar information are encrypted in an encryptor 110f using the master-key Kmi. Further, using the work-key Kw, such program information as the scramble-key Ks, an identification of a broadcast station, service, date, etc. are encrypted in an encryptor 110e.

Although details of the scramble system will not be described here as it is not directly connected with the present invention, audio and video signals are scrambled in a video scrambler 110a and an audio scrambler 110b using PN signals. The PN signals for the scrambling are fed from a PN signal generator 110c and this signals are random data which change successively. The initial state of the PN signal generator 110c is setup by the scramble-key Ks. The scrambled audio signals are multiplexed in a multiplexer 110d and then results to sub-signals together with encrypted program information and peculiar information at a timing to initialize the PN signal generator 110c. This sub-signals and the scrambled video signals are broadcasted from the broadcast station 110.

Privacy of the broadcast signal is increased by the triple encrypted structure using the work-key Kw and the master-key Kmi. Further, the peculiar information can be sent to the subscriber's decryptor 210 through a telephone line or an IC card.

In the decryptor 210, audio signal, program information and peculiar information are extracted from the sub-signal of the broadcast signal at a video descrambler 210a and an audio descrambler 210b. The extracted peculiar information is decrypted and restored at a peculiar-information decryption block 210f using the master-key Kmi designated for the decryptor 210. As the peculiar-information decryption block 210f can be suitably performed only by the same master-key Kmi as for the encryption in the encryptor 110f, the peculiar information decryption block 210f having the designated master-key Kmi is able to decrypt the peculiar information. Program information is decrypted at a program information decryption block 210c using the work key Kw from the received peculiar information. In this case, unless using the same work-key Kw for the encryption in the encryptor 110c, the program information cannot be decrypted properly. The program information and peculiar information thus obtained are collated in a subscription terms collator 210g and only when both subscription terms agreed with each other are and judged that the information can be descrambled, a PN generator 210c is operated to generate a PN signal using the scramble-key Ks of the program information. In the video descrambler 210a and the audio descrambler 210b, the descrambling is carried out through addition, etc. using this PN signal.

The scramble-key Ks is a value needed for descrambling audio and video signals and only when it is the same value as in the scrambling, audio and video signals are descrambled to be output. As the work-key Kw is needed to restore the scramble-key Ks, a decryptor that has not the work-key Kw cannot obtain the proper scramble-key Ks. Further, peculiar information containing the work-key Kw is transmitted from the broadcast station 110 so as to supply only a peculiar information containing the alterable work-key Kw to a decryptor of a subscriber who desires to continue the subscription. To restore peculiar information containing the work-key Kw, the master-key Kmi is needed and only a decryptor that has the master-key Kmi can get peculiar information. The master-key Kmi is set at a value which varies for each peculiar decryptor. This value has been preset before a decryptor is delivered to a subscriber, for instance, when shipped from a plant.

In such a decryptor for the pay broadcast as described above, such the processing as encryption/decryption process. Collation of subscription terms in a decryptor is generally carried out using a microcomputer system. A circuit containing this microcomputer system is incorporated in the IC card so as to make it possible to provide a new IC card at a renovation of the subscription. FIG. 10 shows an example of the structure of a decryptor which performs the encryption/decryption process and the collation of subscription terms by the IC card.

The decryptor shown in FIG. 10 is in the same construction as the decryptor 210 shown in FIG. 9 and a microcomputer system for performing the processes described above is incorporated in an IC card 220. The IC card 220 and the main body of the decryptor communicates signals through a connector. The IC card 220 has an identification code (ID) memory 210j written in a non-volatile memory such as ROM in addition to the master-key Kmi, and an ID collator 210h is provided in the main body of the decryptor. The ID contained in the peculiar information extracted from the sub-signal of the broadcast signal is collated with the ID memory in the ID collator 210h and the peculiar information is fed to the IC card 220 only when both IDs agreed with each other. When program information and peculiar information are decrypted and subscription terms agree with each other, a switch 219i is turned ON and the scramble-key Ks is fed to the PN generator 210c. Thus, peculiar information is selected and subscribers are limited to those who contracts from the peculiar information fed to the IC card 220 using a master-key from a master-key file 210k. Further, the ID collator 210h is a circuit required as the communication data velocity with IC card is limited.

FIG. 11 shows an example of the construction of the PN generator 210c presented in Bibliography 1. The PN generator 210c is comprised of linear feedback shift registers (LFSR) 211a, 211b and 211c and non-linear function logic gates (NFs) 212a, 212b and 212c.

The scramble-key Ks is taken into the LFSRs 211a–211c for initializing the PN generator 210c when there are load timing pulses obtained from the sub-signal of the broadcast signal. 18 bits of the scramble-key Ks are fed to registers of the LFSR 211a, 11 bits are fed to registers of the LFSR 211b and 8 bits are fed to registers of the LFSR 211c.

A shift clock that is synchronizing with audio and video signals has been fed to the LFSRs 211a–211c and outputs from six registers in the LFSRs 211a–211c are fed to the NFs 212a–212c. The NFs 212a–212c are constructed using a ROM (Rread Only Memory) and converting 8-bit outputs from the LFSRs 211a–211c to 1-bit outputs by a fixed non-linear logic according to mask patterns to output them. A change-over switch 214 changes over the NFs 212a and 212c according to the change-over signal from the NF 212b and supplies the outputs to an exclusive OR (EX-OR) gate 213. The output provided from one register of the LFSR 211a has been fed to the EX-OR gate 213 and the output of the NF 212a or the NF 212c are supplied to the video descrambler 210a and the audio descrambler 210b as the PN signal.

The states of the LFSRs 211a–211c are shifted from the initial state when the scramble-key Ks was fed according to the shift clock and the outputs of the NFs 212a–212c will then change. Thus, the descrambling is carried out using the PN signal randomly varying with time.

Further, although the NFs 212a–212c were used in this example, there is such a construction where 1-bit register outputs of the LFSRs 211a–211c are fed directly to the change-over switch 214 or the EX-OR gate 213 or used as PN signal.

In the conventional decryptor as described above, the system security may be reduced if the master-key Kmi, the decryption algorithm and the mechanism of the PN generator are known to others. Therefore, to assure the system security, for example, in the example shown in FIG. 9 it is required to incorporate the video descrambler 210a, audio descrambler 210b, the PN generator 210c and microcomputer system which are used in the decryptor 210 in a single IC chip for making difficult the analysis of the system security.

Further, in case of a decryptor using the IC card 220 as shown in FIG. 10, there was a problem that the construction of the PN generator 210c becomes easily known to others because the scramble-key Ks is fed to the PN generator 210c from the IC card 220.

SUMMARY OF THE INVENTION

It is, therefore, an object of the present invention to enhance the security of the PN generator of a decryptor.

In order to achieve the above object, a decryptor according to first aspect of the present invention includes a descrambler for descrambling the scrambled signals using PN signal, a PN generator which shifts the state successively from its initial state setup by a scramble-key, generates PN signals based on a conversion logic at the shifted state and is capable of changing a for generating PN signals and a controller for decrypting a scramble-key from the scrambled signal and giving information for specifying a scramble-key and PN signal generating logic.

Further to the first aspect of the decryptor, a decryptor according to second aspect of the present invention includes a non-linear logic for generating a signal to get a PN signal from the shifting state based on a conversion logic and is capable of changing the conversion logic.

Further to the first aspect of the decryptor, in a decryptor according to third aspect of the present invention the PN generator is constructed to include a register which shifts the state successively from the initial state setup by the scramble-key and is able to change the state and a logic circuit for generating a signal to get the PN signal by converting the state of the register.

Further to the first aspect of the decryptor, in a decryptor according to fourth aspect of the present invention the PN generator is constructed to include linear feedback registers which shift the state successively from the initial state setup by the scramble-key and of which state shifting logic is alterable.

Further to the first aspect of the decryptor, in a decryptor according to fifth aspect of the present invention the controller is constructed on an IC card with an identification code (ID) written and provides a scramble-key to the PN generator when the ID transmitted together with scrambled signals agreed with the ID on the IC card.

Further to the fifth aspect of the decryptor, in a decryptor according to sixth aspect of the present invention a supply voltage detector is further provided for detecting the ON-status of the power source of the IC card and the controller provides information for specifying the PN signal generating logic to the PN generator when the IC card is inserted into the main body of the decryptor.

Further to the first aspect of the decryptor, in a decryptor according to seventh aspect of the present invention a supply voltage detector is further provided for detecting the ON-status of the power source of the main body of the decryptor and the controller provides information for specifying the PN signal generating logic to the PN generator when the power ON of the main body is detected.

Further to the first aspect of the decryptor, in a decryptor according to eighth aspect of the present invention the controller provides information for specifying the PN signal generating logic to the PN generator when a PNG change flag indicating the change of the PN signal generating logic is received together with the scrambled signal.

Further to the first aspect of the decryptor, in a decryptor according to ninth aspect of the present invention the controller has plural information for specifying the PN signal generating logic and selecting information for specifying the PN signal generating logic corresponding to the PNG selecting information, provides the selected information to the PN generator when PNG selecting information for selecting information for specifying the PN signal generating logic and a PNG change flag indicating the change of the PN signal generating logic are received together with the scrambled signal.

Further to the first aspect of the decryptor, in a decryptor according to tenth aspect of the present invention a collator is further provided for giving a scramble-key to the PN generator only when an identification code (ID) stored in the ID memory agreed with the ID on an IC card.

Further to the tenth aspect of the decryptor, in a decryptor according to eleventh aspect of the present invention the controller writes the ID on the IC card when it has not been stored in the ID memory.

According to the decryptor according to the first aspect of the present invention, it is possible to change a PN signal generating logic according to the information fed from the controller and by this change, a generating PN signal becomes different. That is, the PN generator operates in the substantially different construction and the descrambling is carried out by a PN signal thus obtained and therefore, an additional process will become necessary to investigate the logic construction for PN signal generation of the PN generator. Accordingly, it becomes possible to maintain secrecy an promote security of the decryptor as it is not easy to known the logic construction.

According to the decryptors according to the second, third and fourth aspects of the present invention, the PN generator is comprised of registers which shift the state and a non-linear logic or a logic circuit and as a conversion logic of the non-linear logic is alterable or a state shifting logic of a linear feedback register is alterable, a PN signal generating logic can be changed and thus, its internal construction is made difficult to reveal from outsides in similar to the decryptor as claimed in claim 1.

According to the decryptor according to the fifth aspect of the present invention, the descrambling can be made according to peculiar conditions as a scramble-key is fed to the PN generator when IDs agreed with each other.

According to the decryptor according to the sixth aspect of the present invention, as information for specifying a PN signal generating logic is fed to the PN generator when the IC card is inserted into the main body of the decryptor, a circuit can be such that its content can be erased when the power source is turned OFF and so, a hardware cost can be made cheap.

According to the decryptor according to the seventh aspect of the present invention, as information for specifying a PN signal generating logic is setup at the time of starting, the decryptor can be in such construction that retention of information for specifying a PN signal generating logic may not be required when the power source is turned OFF.

According to the decryptor according to the eighth aspect of the present invention, as information for specifying a PN signal generating logic is setup to the PN generator when a PNG change flag indicating the change of a PN signal generating logic is received together with a scrambled signal, the operation of the PN generator can be changed according to programs, and therefore a secrecy of respective programs can be maintained and program security is also improved.

According to the decryptor according to the ninth aspect of the present invention, as information for specifying a PN signal generating logic is selected and fed to the PN generator according to a PNG selecting information when the PNG selecting information and a PNG changing flag are received, a PN signal generating logic selecting width is made wide and the operation of the PN generator can be changed according to programs and therefore, secrecy of programs can be maintained and program security is also improved.

According to the decryptor according to the tenth aspect of the present invention, as a scramble-key is fed to the PN generator only when the ID stored in the ID memory agreed with the ID on the IC card, security of an equipment can be improved.

According to the decryptor according to the eleventh aspect of the present invention, as a scramble-key is fed to the PN generator and the main body of the decryptor can be used only when the ID stored in the ID memory agreed with the ID on the IC card, security of the main body of the decryptor becomes more higher.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 9:
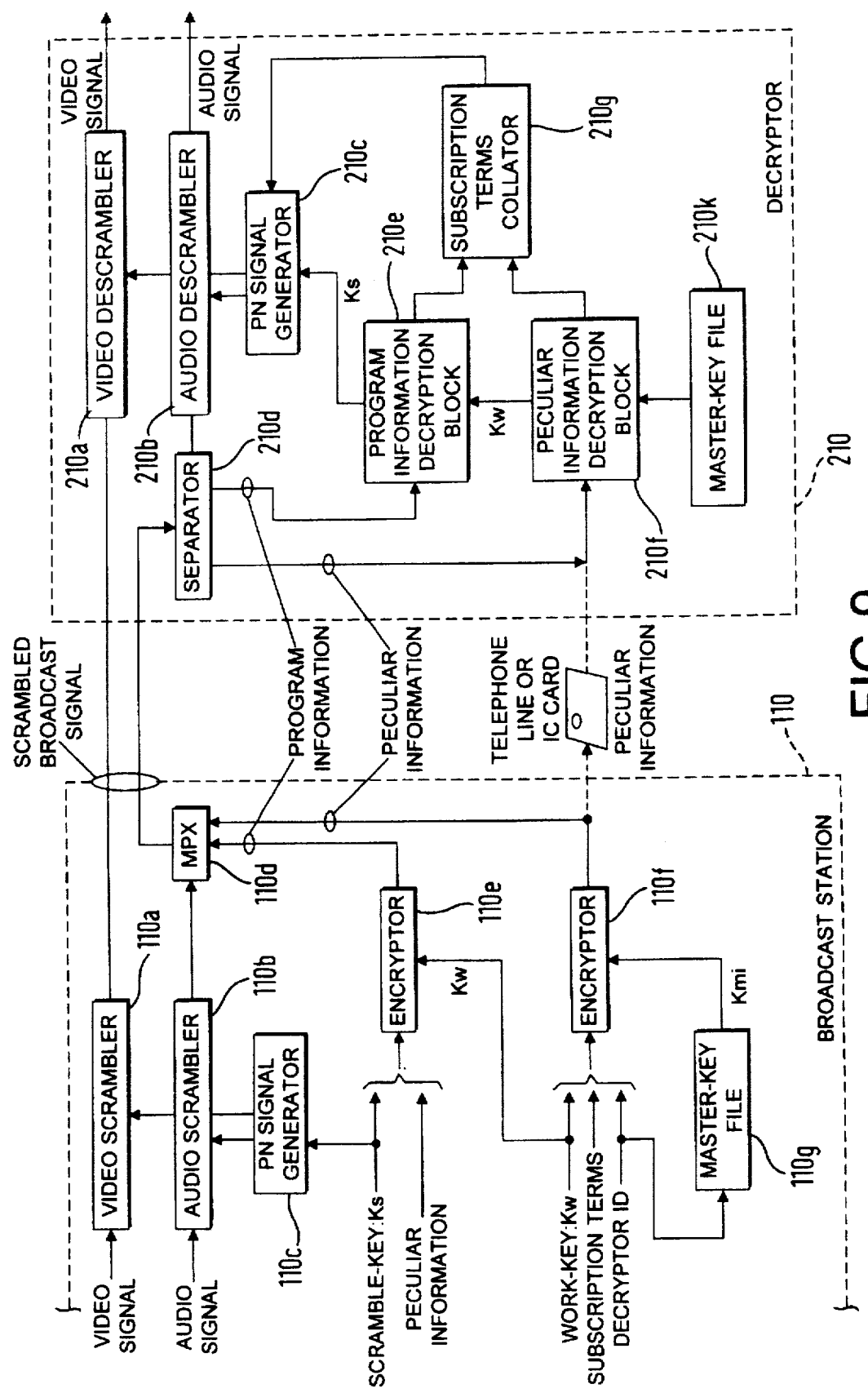
FIG. 9 is a diagram showing the scrambled broadcast system.
Figure 10:
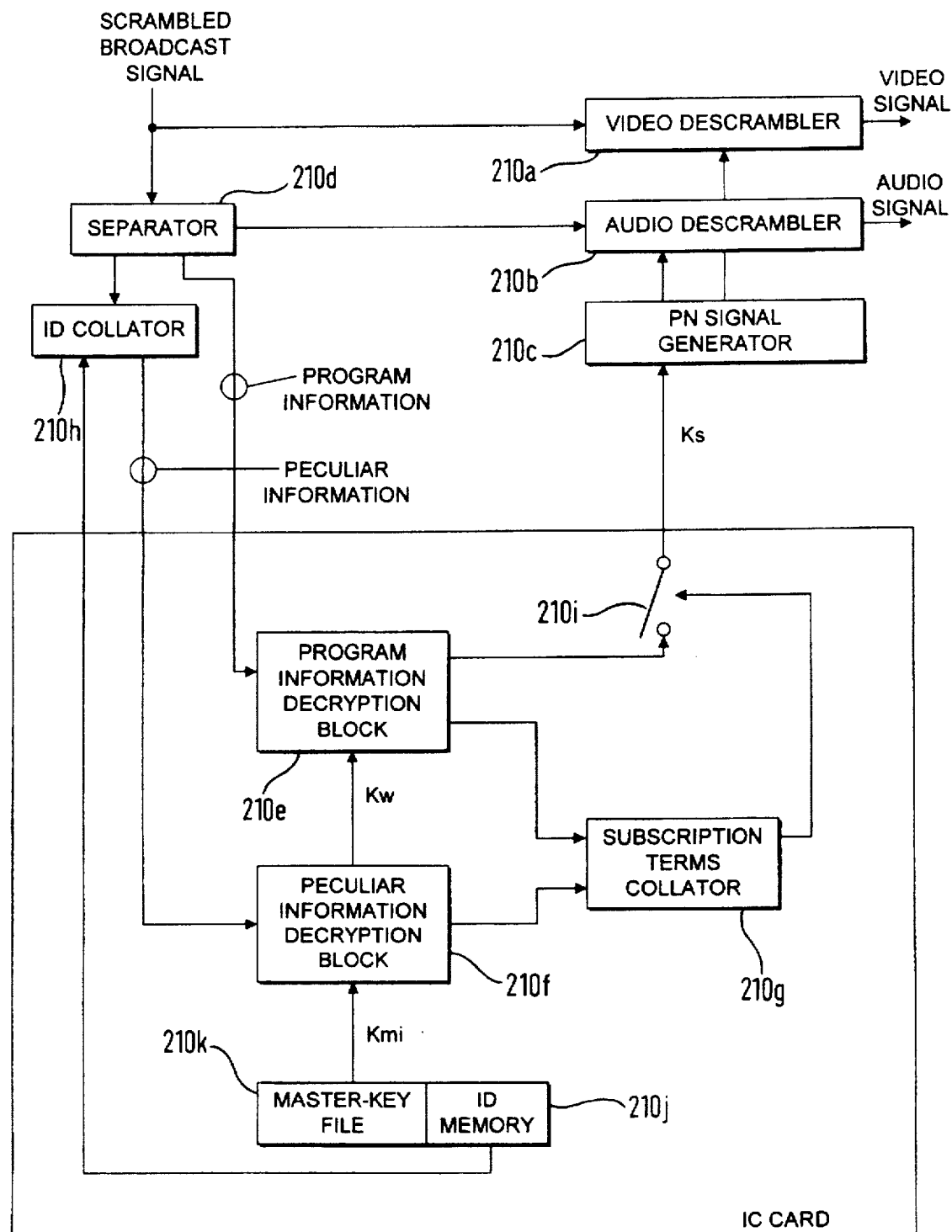
FIG. 10 is a diagram showing the construction of the decryptor involved in a conventional decryptor.
Figure 11:
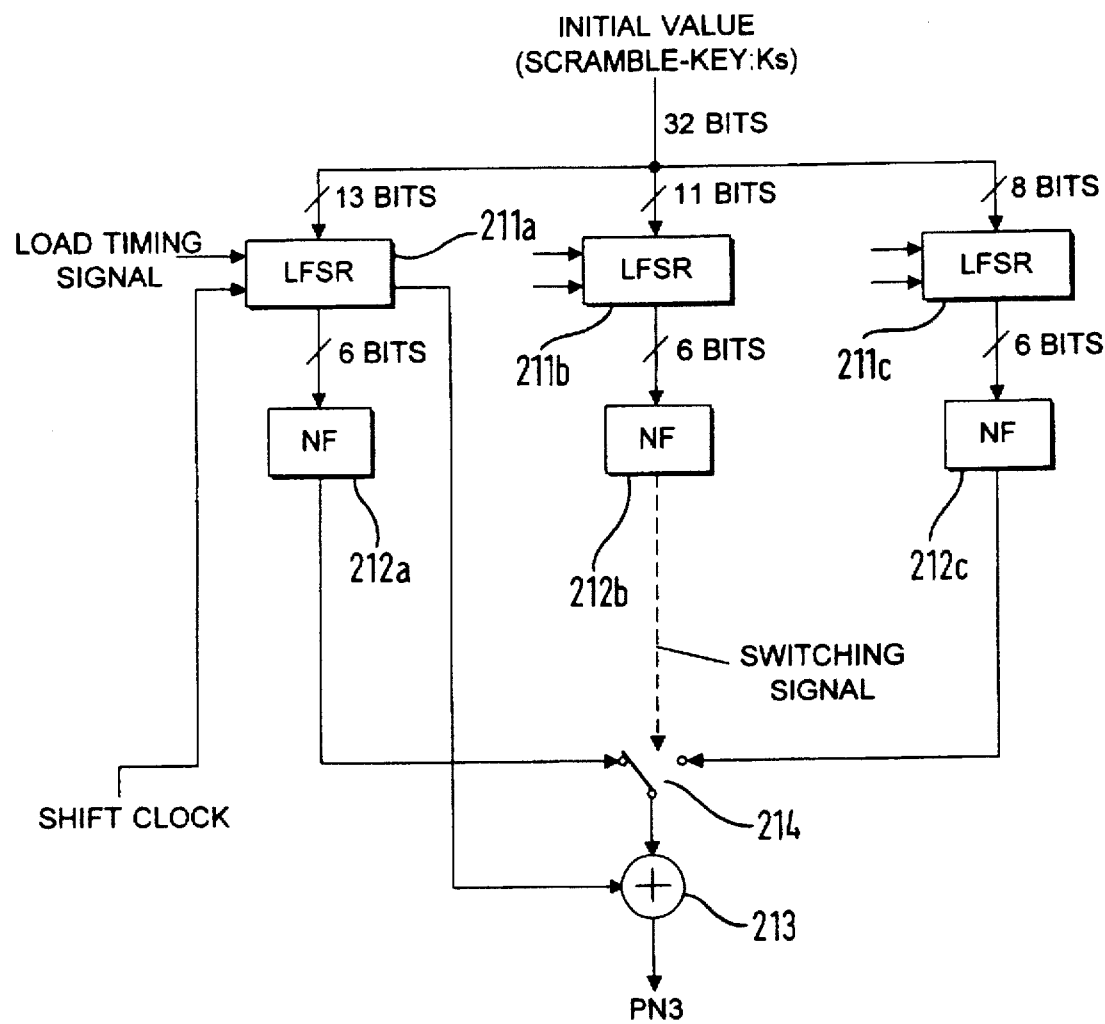
FIG. 11 is a diagram showing the construction of the PN generator involved in a conventional decryptor.

The present invention will be described in detail with reference to the FIGS. 1 through 8 and 12. Throughout the drawings, reference numerals or letters in FIGS. 9 through 11 will be used to designate like or equivalent elements for simplicity of explanation.

Figure 1:
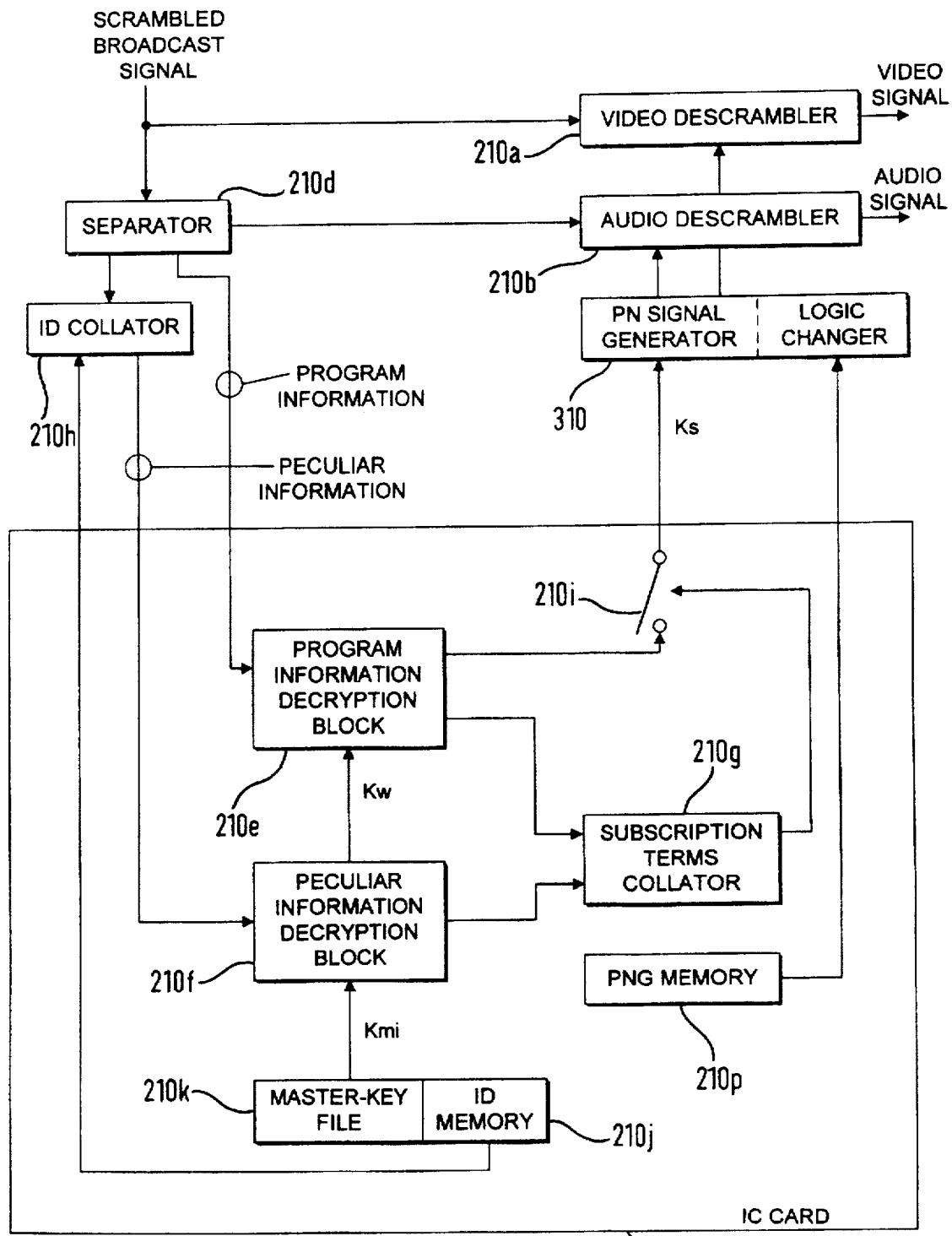
FIG. 1 is a diagram showing the construction of the decryptor involved in a first embodiment.

FIG. 1 shows the construction of a decryptor involved in a first embodiment. Likewise the conventional decryptor described above, this decryptor has a separator 210d for extracting audio signal, program information and peculiar information from sub-signals of scrambled broadcast signals, a video descrambler 210a for descrambling scrambled video signals of broadcast signals to video signals, an audio descrambler 210b for descrambling scrambled audio signals obtained from sub-signals to audio signals and an ID collator 210h for collating an identification code (ID) contained in peculiar information with an ID memory 210j of an IC card 220. Further, although various processes are similar to those of the conventional decryptor described above, this decryptor is characterized in that the processing routine of the microcomputer system and the construction of a PN generator 310 are different from those shown in the conventional decryptor.

Figure 2:
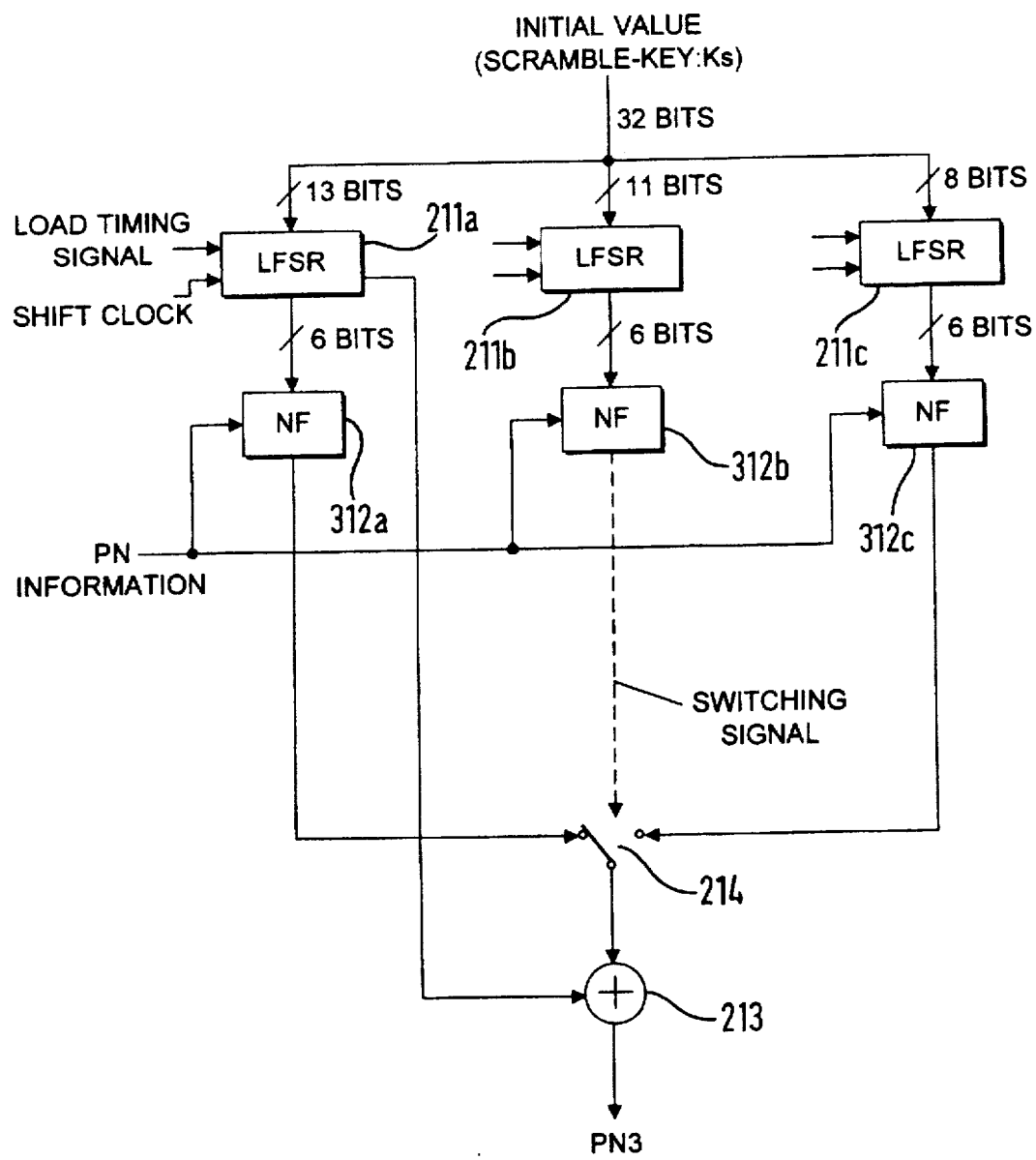
FIG. 2 is a diagram showing an embodiment of the construction of the PN generator which is capable of changing a PN generating logic.
Figure 3:
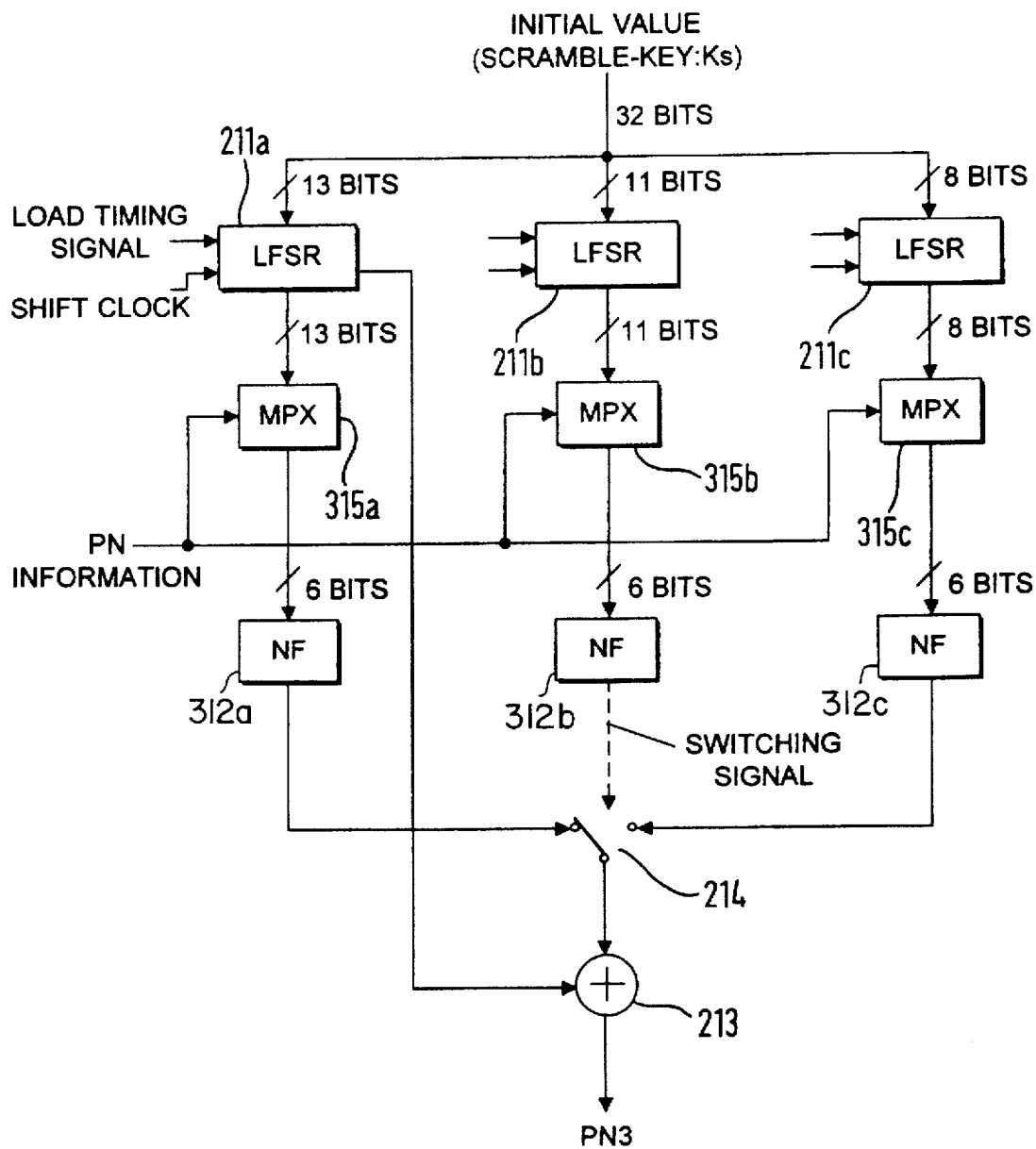
FIG. 3 is a diagram showing an embodiment of the construction of the PN generator which is capable of changing the PN generating logic.
Figure 4:
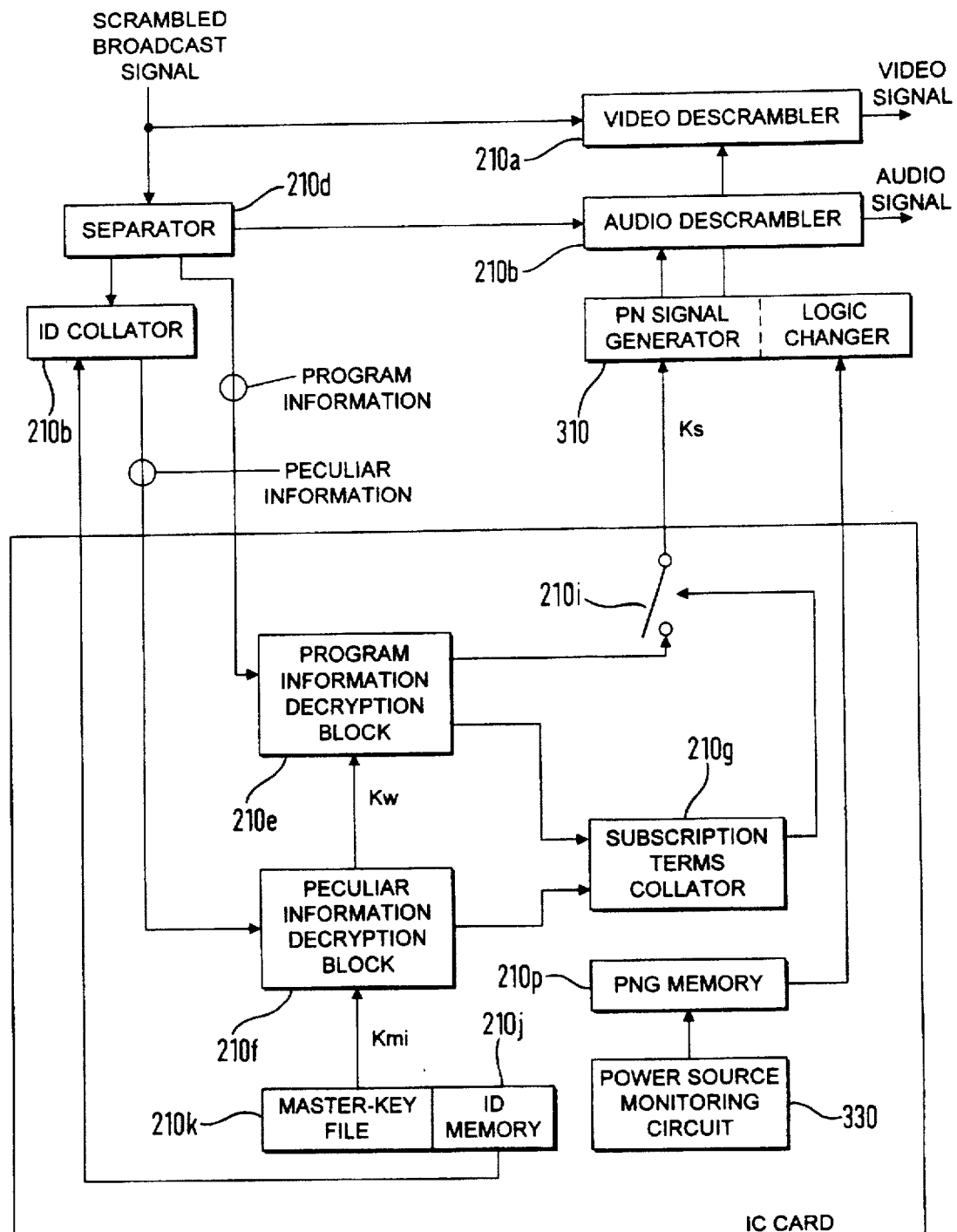
FIG. 4 is a diagram showing the construction of the decryptor involved in a second embodiment.

The PN generator 310 is a circuit which shifts from the initial state successively and generate PN signals based on a conversion logic from the shifted state. This PN signal generating logic has a alterable portion; that is, it is characterized in that the PN signal generating logic is alterable. FIGS. 2 and 3 show the example of the construction of this PN generator 310.

The PN generator 310 shown in FIG. 2 is comprised of non-linear logic (NF) 312a, 312b and 312c.

The LFSRs 211a–211c receive the 18 bits, the 11 bits and the 8 bits of the scramble-key Ks, respectively, when there are load timing pulses and the states of the LFSRs 211a–211c shift from the initial state according to a shift clock when the scramble-key Ks is fed.

The NFs 312a, 312b and 312c are comprised of EEPROM or RAM of which content is electrically alterable and it is possible to store PNG altering information into a PNG memory 210p from the microcomputer system of the IC card 210. The NFs 312a, 312b, 312c convert PN signal generating signals to 1-bit signals by a non-linear logic according to the PNG altering information from the PNG memory 210p and output the 1-bit signals. The change-over switch 214 changes over the NFs 312a and 312c and provides to the EX-OR gate 213 according to a change-over signal from the NF 312b. The output from one register of the LFSR 211a has been fed to the EX-OR gate 213 and an EX-OR result between the outputs of the LFSR 211a and the NF 312a or the NF 312c is fed to a video descrambler 210a and an audio descrambler 210b as the PN signal.

The states of the LFSRs 211a–211c shift from the initial state when the scramble-key Ks is fed according to a shift clock and the outputs of the NFs 312a–312c change accordingly. Generation of a random PN signal resulting from such the state shifting is the same as in the conventional decryptor described above but the PN signal generated from the PN generator 310 shown in FIG. 2 becomes different depending on the PNG altering information transferred from the PNG memory 210p into the NFs 312a–312c.

As described above, the PN generator 310 shown in FIG. 2 makes PN signal generating logic alterable by changing the conversion logic of the non-linear logic 312a, 312b, 312c.

The PN generator 310 shown in FIG. 3 makes the states of the LFSRs 211a–211c alterable, thus making the conversion logic equivalently alterable.

The PN generator 310 shown in FIG. 3 uses the LFSRs 211a–211c, the NFs 312a–312c, the change-over switch 214 and the EX-OR gate 213 which are the same as those shown in the conventional decryptor. Between the LFSRs 211a–211c and the NFs 312a–312c, multiplexers (MPXs) 315a–315c are connected to construct registers together with the LFSRs 211a–211c. The multiplexer 315a selects 8 bits within 13 register outputs of the LFSR 211a, the multiplexer 315b selects 8 bits within 11 register outputs of the LFSR 211b and the multiplexer 315c selects 8 bits within 8 register outputs of the LFSR 211c according to the PN information from the PNG memory 210p of the microcomputer system of the IC card 220 and supply the selected outputs to the NFs 312a–312c. The NFs 312a–312c are logic circuits to get signals for generating PN signals by converting the outputs of the registers.

Thus, it becomes possible to make the logic for generating PN signals alterable by switching and supplying the outputs of the LFSRs 211a–211c to the NFs 312a–312c.

Figure 12A:
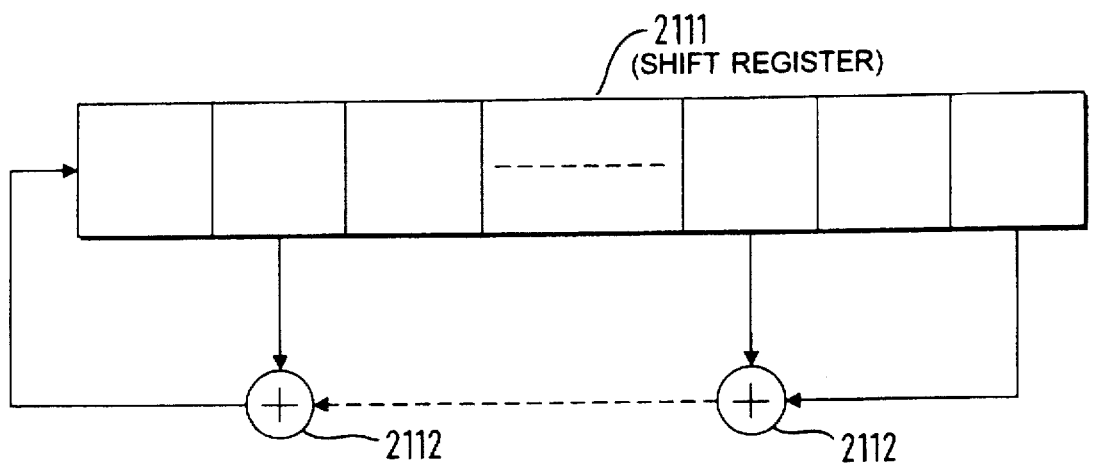
FIGS. 12a and 12b are diagrams showing an example of the construction of an LFSR.

As the general construction of the LFSRs 211a–211c, a register for generating M-series PN codes as shown in FIG. 12a is known. The LFSRs 211a–211c are comprised of an n-stage shift register 2111 and an EX-OR gate 2112 and the state of the k-th stage ($1 \leq k \leq n$) of the shift register 2111 is sequentially operated EX-OR operations and then the resulted EX-ORs are applied to the first stage of the shift register 2111 to shift the state by supplying a shift clock to the shift register 2111.

Figure 12B:
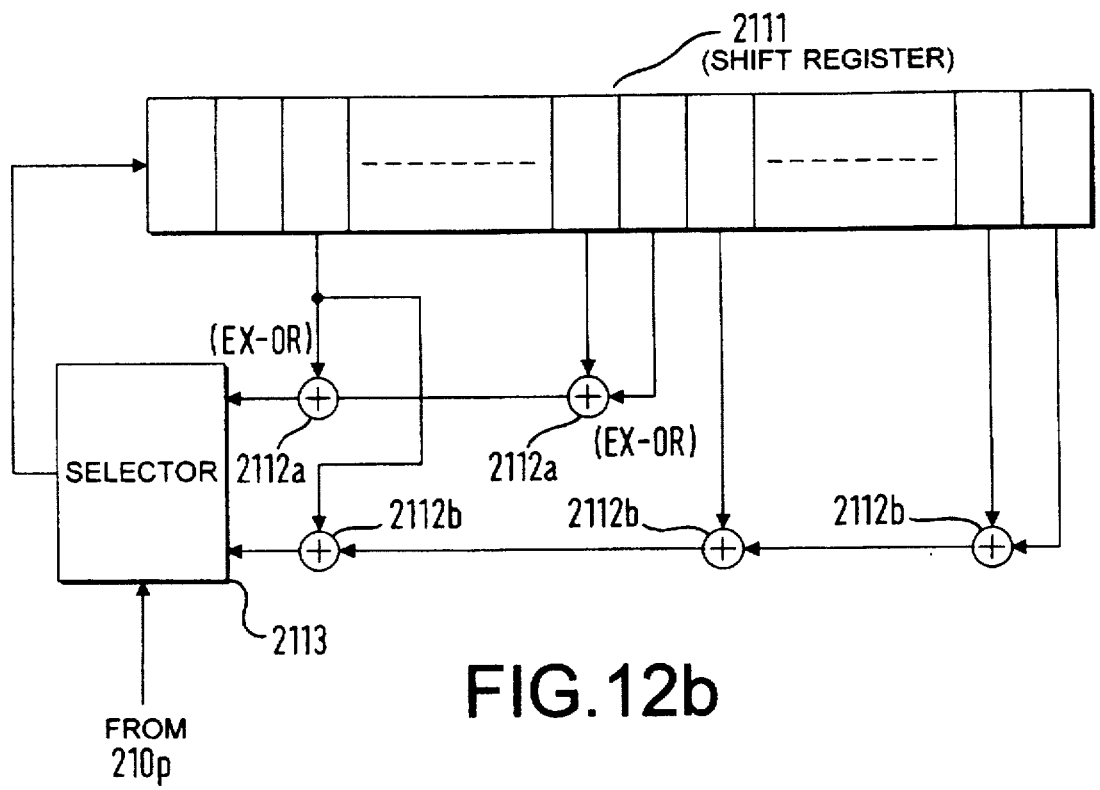

A circuit devised by the inventor of this invention as shown in FIG. 12b is also usable as the LFSRs 211a–211c. This circuit differs from the circuit shown in FIG. 12a in that this circuit has a first EX-OR gate 2112a which operates an EX-OR of prescribed output of the shift register 2111 successively, a second EX-OR gate 2112b which operates an EX-OR of the different output of the shift register 2111 (further, a third and a fourth EX-OR may be provided) and a selector 2113 which selects these calculating results according to the PNG altering information of the PNG memory 210b.

In the IC card 220 shown in FIG. 1, a microcomputer system, which is a controller, has been incorporated and its decryption blocks are shown in this FIG. 1. A master-key Kmi and an ID are stored in a master-key file 210k and an ID memory 210j in the IC card 220. The IC card 220 has a peculiar-information decryption block 210f which decrypts and stores signals from the extracted peculiar information using the master-key Kmi likewise the conventional decryptor, a program-information decryption block 210c which decrypts program information using the work-key Kw in the peculiar information obtained through decryption, a subscription terms collator 210g which collates subscription terms of program information and peculiar information and judges whether the subscription terms agree with each other, and a switch 210i for selectively supplying a scramble-key Ks extracted from program information to the PN generator 310. Likewise the conventional decryptor, when the master-key Kmi and the IDs from the master-key file 210k and ID memory 210j agree with those as received, subscription terms agree with each other and it is judged that scrambled signals can be descrambled, the switch 210i selectively supplies the scramble-key Ks to the PN generator 310 so that a broadcasted program can be suitable processed. Further, PNG altering information for specifying the conversion logic of the PN generator 310 is written into ROM of the IC card 220 and the microcomputer system of the IC card 220 supplies the PNG altering information from the PNG memory 210p to the PN generator 310.

The operation of the decryptor shown in FIG. 1 is the same as the conventional decryptor except the portions related to the PN generator 310 and the PNG memory 210p. Audio signal, program information and peculiar information are extracted from the sub-signal at the separator 210d and the ID contained in peculiar information is collated with the ID memory 210j of the IC card 220 in the ID collator 210h, and when they agree with each other, the peculiar information is decrypted by the peculiar-information decryption block 210f of the IC card 220 using the master-key Kmi. Further, program information is decrypted in the program-information decryption block 210e using the work-key Kw of the peculiar information and when it is judged in the program-information decryption block 210e that subscription terms agree with each other, the scramble-key Ks contained in the program information is fed to the PN generator 310.

As the PN signal generating logic is alterable, the PN generator 310 generates the PN signal randomly varying with time from its initial state based on the PNG altering information from the PNG memory 210p and provides the corresponding PN signal to the video descrambler 210a and the audio descrambler 210b. Descrambled video and audio signals are thus obtained. If the PNG altering information 210p from the PNG memory of the IC card 220 is newly fed, the state, shifting becomes different according to the new PNG altering information in the PNG memory 210p and the PN generator 310 generates a different PN signal and operates as a PN generator in the substantially different construction. The descramble is carried out by the new signal thus obtained.

As the logic for generating PN signals by the PN generator 310 is alterable in this decryptor as described above, it is made difficult to reveal its construction by suitable modifying. Therefore, it is possible to maintain high secrecy and security of this decryptor becomes high.

Now, a second embodiment of the present invention will be described in the following.

A decryptor involved in the second embodiment is in the same construction as the first embodiment described above as shown in FIG. 4 but differs from the first embodiment in that a power source monitoring circuit 330 is provided to the IC card 220 to monitor supply voltage. When the power ON of the power source monitoring circuit 330 is sensed, the microcomputer system of the IC card 220 supplies the PNG altering information from the PNG memory 210p to the PN generator 310.

In case of the decryptor is this second embodiment, when the power source of the decryptor is turned ON at the state where the IC card 220 is inserted, the power ON is sensed by the power source monitoring circuit 330. The PNG altering information in the PNG memory 210p of the IC card 220 is fed to the PN generator 310. Thus, the PN generator 310 is able to generate PN signal. The operations of the decryptor after the IC card 220 is inserted are the same as those in the first embodiment and as the PN generating logic is alterable, the PN generator 310 is able to maintain secrecy and security of this decryptor becomes high.

In case of this embodiment, as the PNG altering information is provided to the PN generator 310 from the PNG memory 210p of the IC card 220 when started, it becomes unnecessary for the PN generator 310 to retain the PNG altering information in the PNG memory 210p when the power source is turned OFF. Therefore, there is such a merit that a hardware cost becomes cheap because such a circuit, for instance, as a RAM (Random Access Memory) of which contents can be erased when the power source is turned OFF can be used if such a PN generator 310 as shown in FIG. 2 is used.

Next, a third embodiment will be described in the following.

A decryptor involved in this third embodiment is in the same construction as the decryptor in the second embodiment, as shown in FIG. 2, but differs in that the microcomputer system of the IC card 220 provides the PNG altering information of the PNG memory 210p to the PN generator 310 when the IC card 220 is inserted. The power source monitoring circuit 330 monitors the ON-status of the power source in the IC card 220 and when sensing the power ON as the IC card 220 is inserted, provides a signal to the microcomputer system. By this signal, the microcomputer system provides the PNG altering information of the PNG, memory 210p to the PN generator 310 in the initial communication with the main body of the decryptor.

In the decryptor involved in this third embodiment, the PNG altering information of the PNG memory 210p is fed to the PN generator 310 when the IC card 220 is inserted and the PN generator 310 becomes to be able to generate PN signal. The operations after the IC card 220 is inserted are the same as those in the first embodiment and as the PN signal generating logic is alterable, the PN generator 310 is able to maintain secrecy and security of this decryptor becomes high. In this embodiment, it is required to be constructed by using a circuit, for instance, an EEPROM (Eelectrically Erasable and Programmable ROM) of which content is not erased when the power source is turned OFF. On the other hand, as the PNG altering information 210 is retained in the PN generator 310, it is possible to use not only the IC card 220 retaining the PNG altering information in the PNG memory 210p but also the IC card 220 retaining no PNG altering information in the PNG memory 210p.

Next, a fourth embodiment of the present invention will be described in the following.

Figure 5:
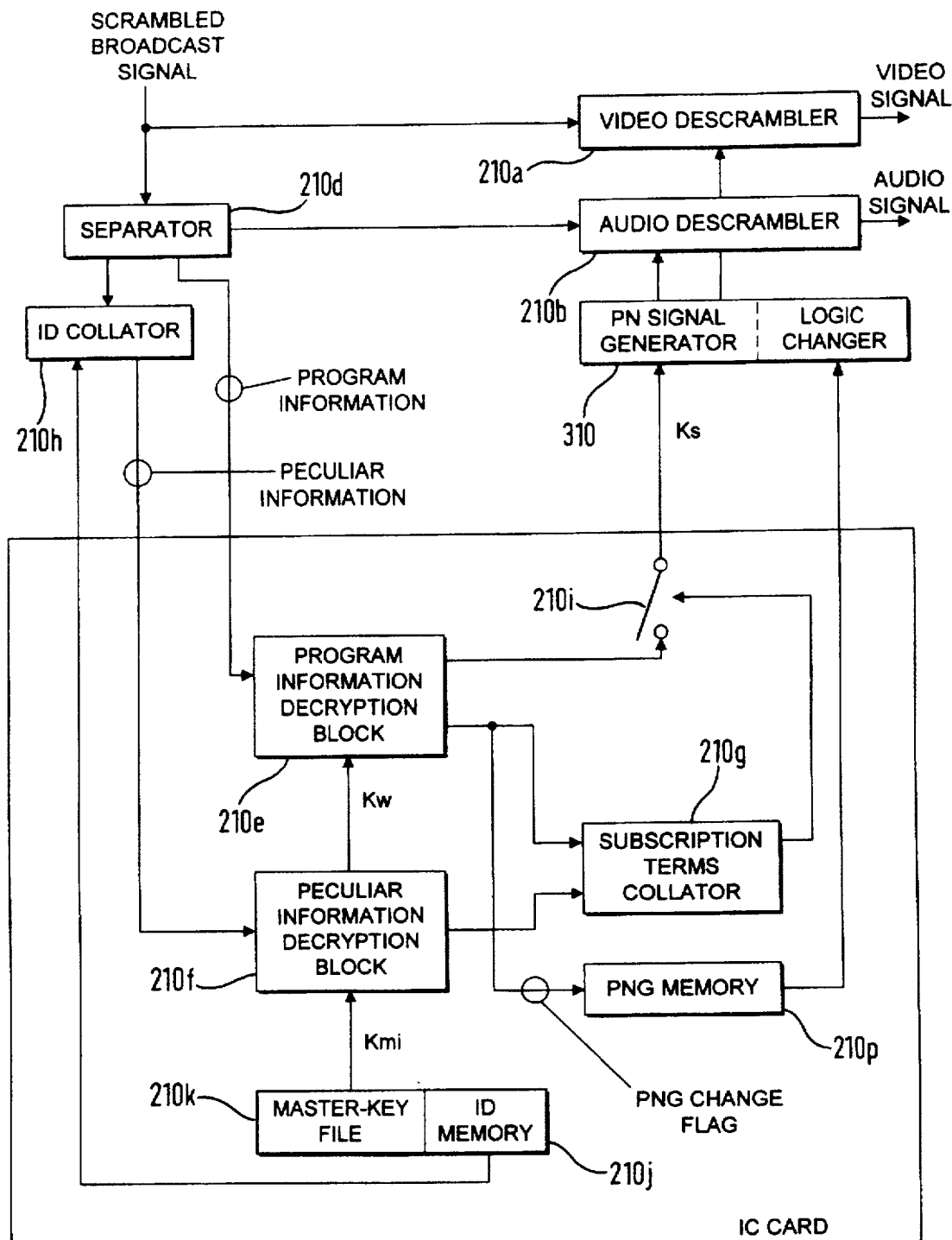
FIG. 5 is a diagram showing the construction of the decryptor involved in a third embodiment.
Figure 6:
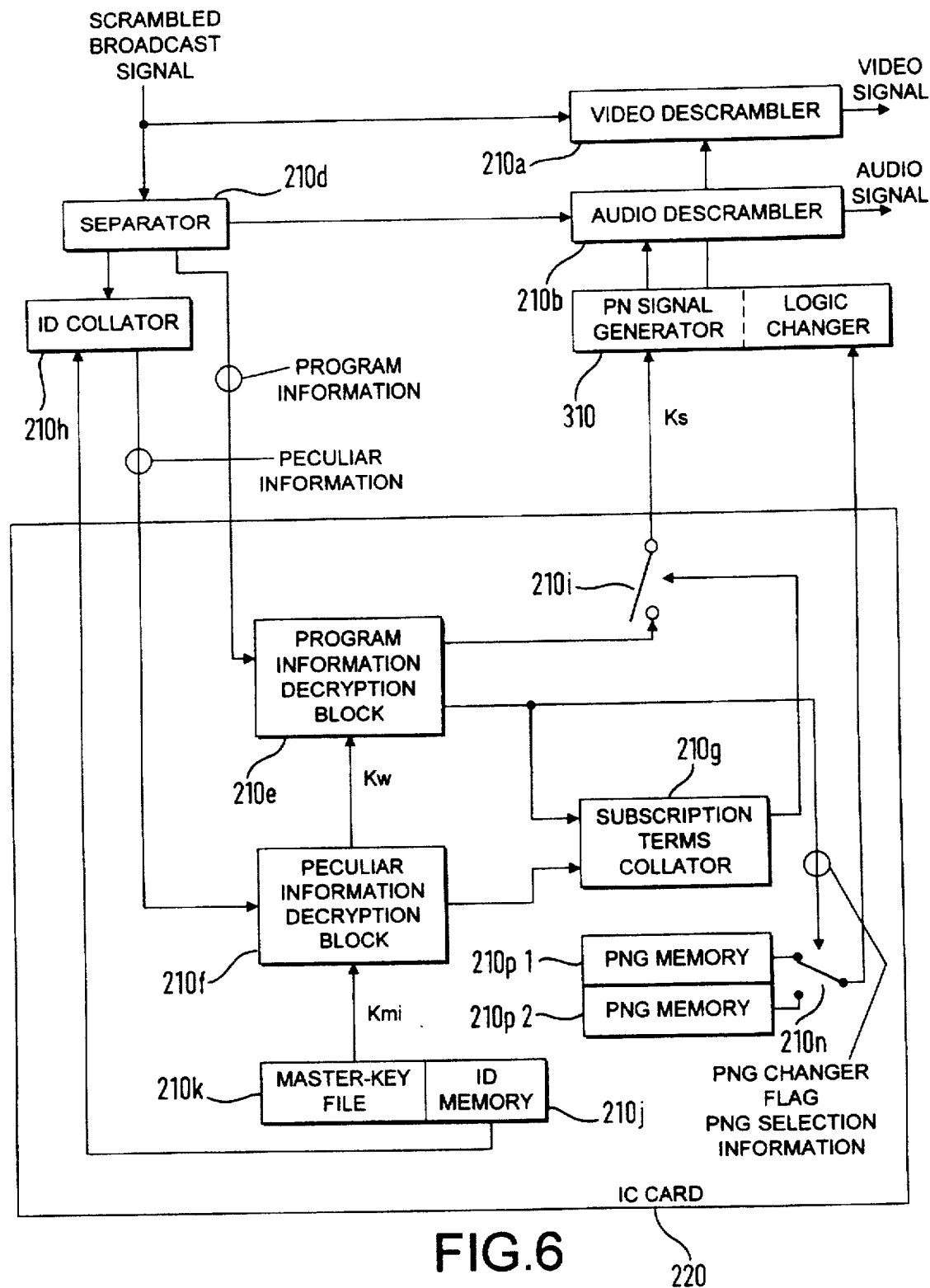
FIG. 6 is a diagram showing the construction of the decryptor involved in a fourth embodiment.

A decryptor involved in this fourth embodiment is in the same construction as the decryptor in the first embodiment as shown in FIG. 5 but differs in that the microcomputer system provides the PNG altering information of the PNG memory 210p to the PN generator 310 according to a PNG change flag contained in program information.

When program information containing a PNG change flag is received from the broadcast station and the PNG change flag is detected at the decryptor, the microcomputer system changes the operation of the PN generator 310 by giving the PNG altering information of the PNG memory 210p to the PN generator 310. The operation of the PN generator 310 is alterable according to a program by sending a PNG change flag according to a program from the broadcast station. Therefore, secrecy can be retained for programs and security of not only this decryptor but also programs becomes high.

Next, a fifth embodiment of the present invention will be described in the following.

A decryptor involved in the fifth embodiment is in the same construction as the decryptor in the fourth embodiment described above as shown in FIG. 16 but differs from the decryptor in the first embodiment in that it has two PNG memories 210p1, 210p2 and a decryption block 210m to select PNG altering information by the microcomputer system for giving to the PN generator 310 according to PNG selecting information contained in program information in addition to the PNG altering information giving to the PN generator 310 according to the PNG change flag contained in program information.

When program information containing the PNG change flag and the PNG select information is received from a broadcast station and the PNG change flag is detected at the decryptor, the microcomputer system selects either the PNG altering information of the PNG memories 210p1 and 210p2 according to the PNG selecting information and provides to the PN generator 310. The operation of the PN generator 310 is changed corresponding to the PNG selecting information. Thus, the operation of the PN generator 310 is changed according to a program by providing the PNG change flag and the PNG selecting information. Therefore, secrecy of program can be maintained and security of not only this decryptor but also programs becomes more higher.

Then, a sixth embodiment of the present invention will be described in the following.

Figure 7:
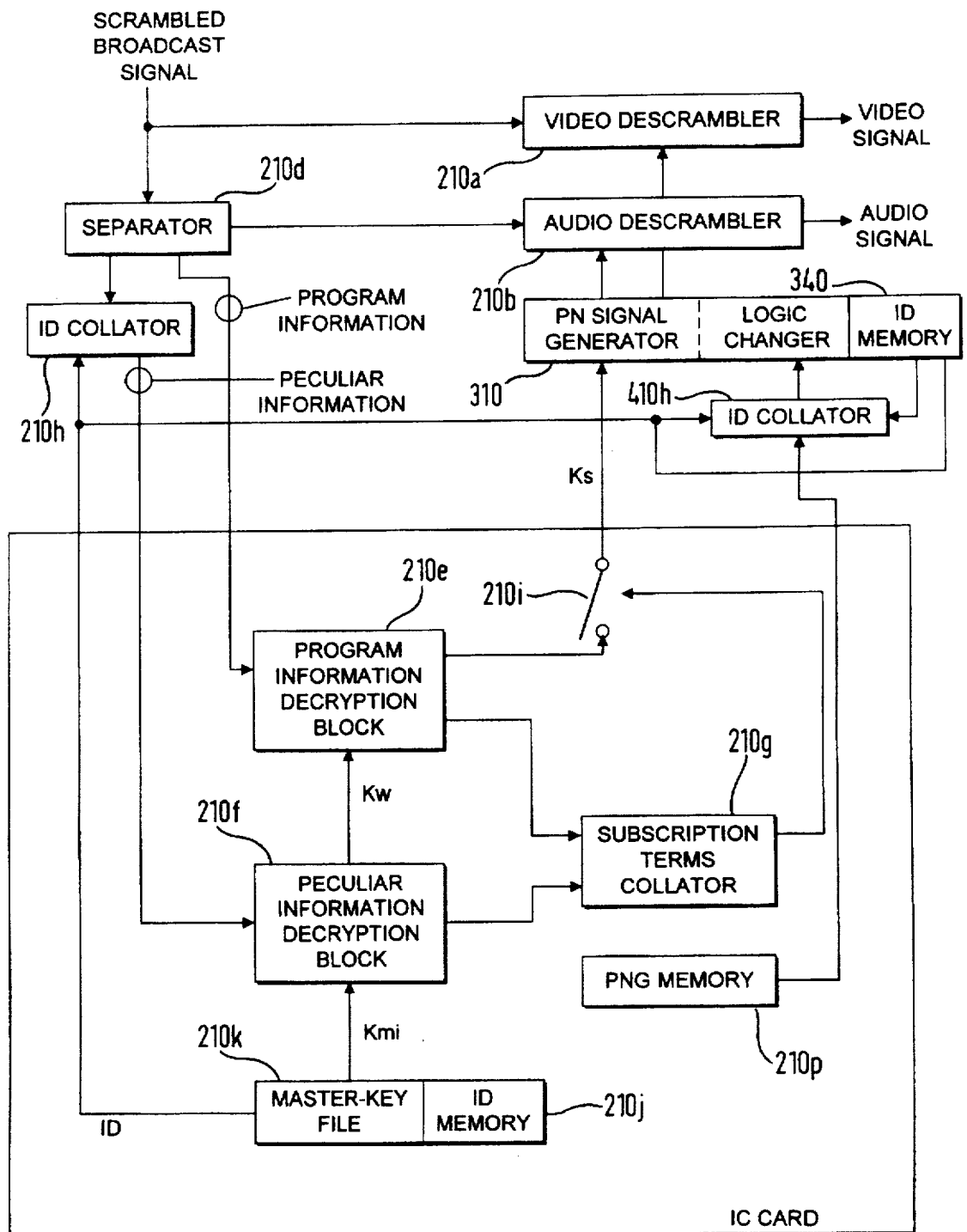
FIG. 7 is a diagram showing the construction of the decryptor involved in a fifth embodiment.

A decryptor involved in this sixth embodiment is in the same construction as the decryptor in the first embodiment as shown in FIG. 7 but differs from the decryptor in the first embodiment in that it has an ID memory 210j to store the decryptor's ID and a collator 410h to collate the ID stored in the ID memory 340 with the ID memory 210j in the IC card 220. The collator 410h provides the PNG altering information 210 from the IC card 220 to the PN generator 310 when the ID stored in the ID memory 340 agreed with the ID in the ID memory 210j in the IC card 220.

Figure 8:
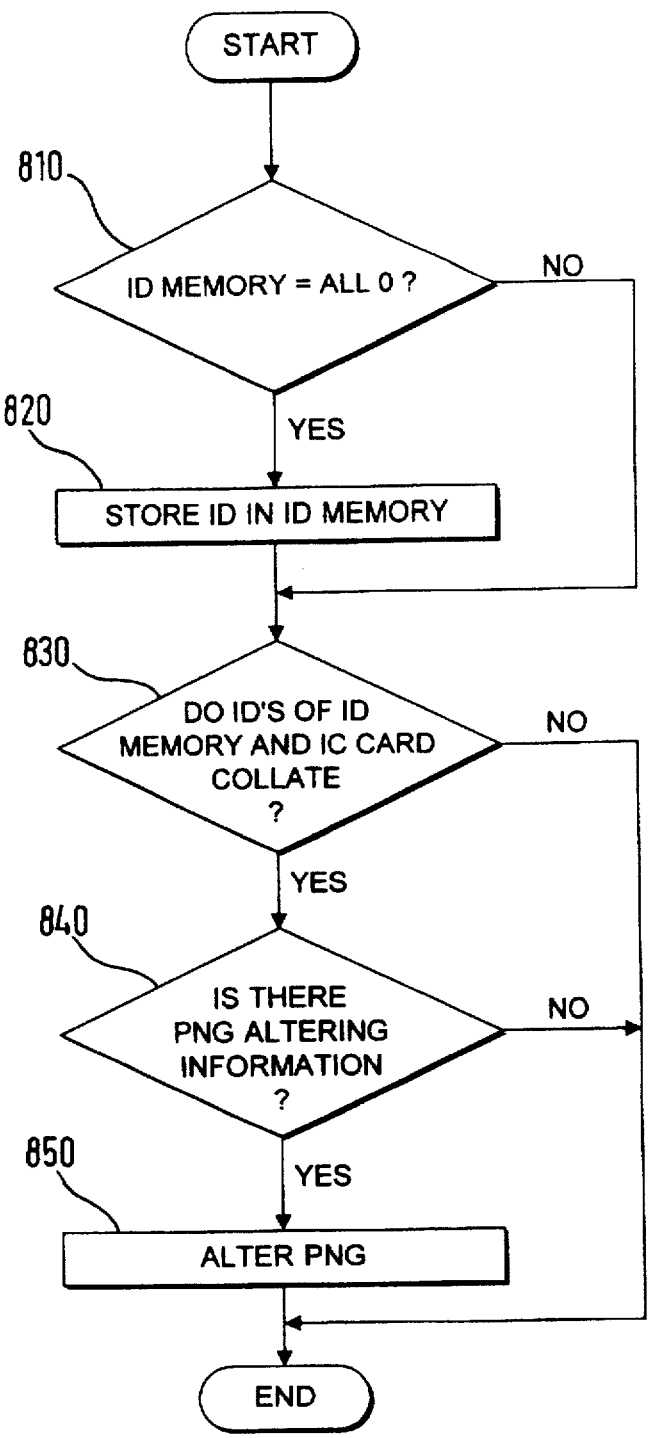
FIG. 8 is a diagram showing the construction of the decryptor involved in a sixth embodiment.

FIG. 8 shows the flow of the PNG changing process of this decryptor. In this embodiment, the microcomputer system of the IC card 220 carries out the process related to the ID memory 340 in addition to the process in the first embodiment.

The microcomputer system of the IC card 220 carries out such a process that it judges whether the ID memory 340 stores the ID by reading the ID memory 340 and if not (when, for instance, all bits are 0), transfers the ID of the ID memory 210j or the IC card 220 into the ID memory 340 (Reference Numerals 810 and 820 in FIG. 8). Thus, when no ID is stored in the ID memory 340, the ID of the IC card 220 which is first inserted is written in the ID memory 340 of the main body of the decryptor.

An ID of the IC card 220 first inserted after the power ON is stored in the ID memory 340 and thereafter, this ID is collated with the ID of the IC card 220 by the collator 410h. Then, only when both IDs agreed with each other, the operation of the PN generator 310 can be changed by the PNG altering information from the IC card 220. Then, if the PNG change information shown in the embodiment described above is demanded, the PNG altering information 210 is fed to the PN generator 310.

Further, even in this case, the operation of the PN generator 310 cannot be changed if the IC card 220 contains no PNG altering information.

As described above, in this embodiment the operation of the PN generator 310 can be changed only when the ID stored in the ID memory 340 was collated with the ID in the ID memory 210j in the IC card 220 and both IDs agreed with each other and so, security of the equipment can be further increased.

It is to be understood that the present invention is not limited to the embodiments described above but is applicable in various modified forms.

For instance, the power source monitoring circuit 330 was provided to the IC card 220 in the second embodiment, but the power source monitoring circuit 330 may be provided in the main body.

Also, the PNG altering information 210 that was written in the IC card 220 was used but it may be included in program information together with the PNG change flag and transmitted from the broadcast station and the PNG altering information 210 contained in the program information may be written in the PN generator 310 by the microcomputer system of the ID card 220 at the decryptor.

Further, the PN generator 310 is not limited to the constructions shown in FIGS. 1 and 2 provided that the logic for generating PN signal is alterable. For instance, it may be in such a construction that the number of stages of the LFSR is changed equivalently and in this case, the PN generator 310 can be constructed using an electrically programmable logic, for instance, a field programmable gate array (FPGA), etc. In this case, it is also possible to change the operation of the PN generator 310 by writing the PNG altering information 210 into the PN generator 310 by the microcomputer system of the IC card 220.

In FIG. 3, the logic circuit uses the NFs 312a–312c but a fixed logic may be constructed using ordinary logic ICs.

As described above, the decryptor according to the first aspect of the present invention is possible to assure secrecy and to enhance the security of the decryptor as it is not easy for the third party to know the construction of the decryptor.

In the decryptor according to the second, third and fourth aspects of the present invention, as the PN generator is comprised of registers which are shifted successively and a non-linear logic or a logic circuit, it is possible to make hard to investigate its internal construction.

In the decryptor according to fifth aspect of the present invention, as the scramble-key is fed to the PN generator only when IDs agreed with each other, it is possible to perform the descrambling corresponding to peculiar conditions.

In the decryptor according to sixth aspect of the present invention, it is possible to reduce the cost of hardwares as information for specifying the PN signal generating logic is fed to the PN generator when an IC card is inserted into the main body of the decryptor and therefore, the circuit can be such that its content is erased when the power source is turned OFF.

The decryptor according to seventh aspect of the present invention can be in such the construction that it may not be necessary to retain information for specifying the PN signal generating logic when the power source is turned OFF as the information for specifying the PN signal generating logic is fed to the PN generator when started.

In the decryptor according to eighth aspect of the present invention, it is possible to assure secrecy of programs and enhance the security of programs as the information for specifying the PN signal generating logic is fed to the PN generator when the PNG change flag indicating the change of the PN signal generating logic is received together with scrambled signals and the operation of the PN generator can be changed according to programs.

In the decryptor according to ninth aspect of the present invention, it is possible to assure secrecy of programs and enhance the security of programs as the information for specifying the PN signal generating logic is selected according to the PNG selecting information and fed to the PN generator when the PNG selecting information and the PNG change flag are received, and the PN signal generating logic selecting width becomes wide and the operation of the PN generator can be changed according to programs.

In the decryptor according to tenth aspect of the present invention, it is possible to enhance the security of equipment as the scramble-key is fed to the PN generator and the main body of the decryptor can be used only when the ID stored in the ID memory agreed with the ID on the ID card.

In the decryptor according to eleventh aspect of the present invention, security of the main body of the decryptor becomes more high as the scramble-key is fed to the PN generator and the main body of the decryptor can be used only when the ID stored in the ID memory agreed with the ID on the ID card.

As described above, the present invention can provide an extremely preferable decryptor.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A decryptor, comprising:

a descrambler for descrambling scrambled signals using a PN signal, the scrambled signals including a scramble-key;

a PN generator for generating the PN signal varying with time starting from an initial value set by the scramble-key, the PN generator including PN signal generating logic having voluntarily changeable conversion logic, responsive to PNG altering information, for altering the PN signal generating logic; and a controller for controlling a decryption of the scramble-key from the scrambled signals and for providing the PN generator with the scramble-key and the PNG altering information needed for setting the PN signal generating logic.

2. A decryptor as claimed in claim 1, wherein the PN signal generating logic includes nonlinear logic for generating a signal for obtaining the PN signal, the nonlinear logic including the voluntarily changeable conversion logic.

3. A decryptor as claimed in claim 1, wherein the PN generator includes:

a register for providing a status signal which various with time starting from the initial value set by the scramble-key, the status signal being provided to the voluntarily changeable conversion logic; and a logic circuit fore generating a change signal to the voluntarily changeable conversion logic for changing the status signal provided from the register to obtain the PN signal.

4. A decryptor as claimed in claim 1, wherein the PN generator includes a linear feedback shift register having a status varying with time, and based on the voluntarily changeable conversion logic, starting from an initial state set by the scramble-key.

5. A decryptor as claimed in claim 1, wherein the controller is formed in an IC card which has a card-specific ID for providing the PN generator with the scramble-key when a transmission ID transmitted with the scrambled signal matches the card-specific ID.

6. A decryptor as claimed in claim 5, further comprising:

a power-ON detector for detecting a power-ON state of the IC card, and wherein the controller provides the PN generator with the PNG altering information for setting the voluntarily changeable conversion logic when the IC card is coupled to the decryptor.

7. A decryptor as claimed in claim 1, further comprising a power-ON detector for detecting a power-ON state of the decryptor, and wherein the controller provides the PN generator with the PNG altering information for setting the voluntarily changeable conversion logic when the power-ON detector detects the power-ON state of the decryptor.

8. A decryptor as claimed in claim 1, wherein the controller provides the PN generator with the PNG altering information for setting the voluntarily changeable conversion logic when a PN generator changing flag indicating a change of the voluntarily changeable conversion logic is received with the scrambled signal.

9. A decryptor as claimed in claim 1, further comprising:

an ID memory for storing a decryptor-specific ID; and a collator for allowing the scramble-key to pass to the PN generator only when the decryptor-specific ID matches with a card-specific ID written in an IC card coupled to the decryptor.

10. A decryptor as claimed in claim 9, wherein the controller writes the card-specific ID into the decryptor when no decryptor-specific ID is stored in the ID memory.

11. A decryptor as claimed in claim 10, wherein the controller is formed in the IC card.

12. A decryptor as claimed in claim 1, further comprising:

a register for providing a status signal, the status signal varying with time starting from the initial value; and the voluntarily changeable conversion logic comprising:

a multiplexer receiving the status signal from the register, nonlinear logic receiving an output of the multiplexer, for generating a signal for obtaining the PN signal, wherein the multiplexor receives the PNG altering information for setting the voluntarily changeable conversion logic and uses the PNG altering information to select some of a plurality of bits from the status signal as the output of the multiplexer.

13. A decryptor as claimed in claim 1, wherein:

the controller further comprises a plurality of information units, each of the information units having the PNG altering information, and when the scrambled signals including a PNG selecting information and a PNG change flag, indicating a change of the voluntarily changeable conversion logic, are received, providing the PNG altering information from one of the plurality of information units selected, based on the PNG selecting information, to the PNG generator for setting the voluntarily changeable conversion logic.

* * * * *